US012597239B2

(12) United States Patent
Mangattuparambil et al.

(10) Patent No.: US 12,597,239 B2
(45) Date of Patent: Apr. 7, 2026

(54) METHOD AND SYSTEM FOR VALIDATING PROMOTIONAL EMAILS AND PRODUCT AVAILABILITY FROM E-COMMERCE WEBSITES

(71) Applicant: HCL Technologies Limited, New Delhi (IN)

(72) Inventors: Hiransha Mangattuparambil, Chennai (IN); Srihari Varadharajan, Chennai (IN); Srinivas Tangirala, Hyderabad (IN); Narender Siddhamshetty, Hyderabad (IN)

(73) Assignee: HCL Technologies Limited, New Delhi (IN)

( * ) Notice: Subject to any disclaimer, the term of this patent is extended or adjusted under 35 U.S.C. 154(b) by 296 days.

(21) Appl. No.: 18/241,920

(22) Filed: Sep. 4, 2023

(65) Prior Publication Data

US 2024/0378867 A1 Nov. 14, 2024

(30) Foreign Application Priority Data

May 10, 2023 (IN) ............................. 202311033050

(51) Int. Cl.
*G06V 10/776* (2022.01)
*G06Q 10/087* (2023.01)
(Continued)

(52) U.S. Cl.
CPC ......... *G06V 10/776* (2022.01); *G06Q 10/087* (2013.01); *G06T 7/11* (2017.01);
(Continued)

(58) Field of Classification Search
CPC .... G06V 10/776; G06V 10/56; G06V 10/759; G06V 10/761; G06V 10/764;
(Continued)

(56) References Cited

U.S. PATENT DOCUMENTS 10,049,385 B2 * 8/2018 Killoran, Jr. ......... G06Q 10/107
10,817,749 B2 10/2020 Biswas et al.
(Continued)

FOREIGN PATENT DOCUMENTS

KR 20190017107 * 2/2019 ......... G06Q 30/0631

OTHER PUBLICATIONS

Son Tran, Shuxiang Xu, Byeong Kang, Matthew Springer; Deep Learning for Retail Product Recognition: Challenges and Techniques; Computational Intelligence and Neuroscience; Nov. 12, 2020; vol. 2020; 23 pages.

*Primary Examiner* — Jerome Grant, II
(74) *Attorney, Agent, or Firm* — Kendal M. Sheets

(57) ABSTRACT

A method and system for validating promotional emails and product availability from E-commerce websites is disclosed. In one embodiment, the method includes retrieving a first set of images corresponding to an image strip and a second set of images corresponding to a promotional email from a database. The first set of images and the second set of images may be associated with one or more products. The method further includes calculating a similarity score between each of the first set of images and each of the second set of images using a first Computer Vision (CV) technique. The method further includes selecting one or more valid images from the second set of images based on the similarity score. The method further includes determining a stock availability status of at least one product presented in the one or more valid images from at least one website using a deep learning algorithm.

13 Claims, 9 Drawing Sheets

(51) Int. Cl.

| | |
|---|---|
| *G06T 7/11* | (2017.01) |
| *G06V 10/56* | (2022.01) |
| *G06V 10/74* | (2022.01) |
| *G06V 10/75* | (2022.01) |
| *G06V 10/764* | (2022.01) |
| *G06V 10/82* | (2022.01) |
| *G06V 10/94* | (2022.01) |

(52) U.S. Cl.
CPC ............ *G06V 10/56* (2022.01); *G06V 10/759* (2022.01); *G06V 10/761* (2022.01); *G06V 10/764* (2022.01); *G06V 10/82* (2022.01); *G06V 10/95* (2022.01); *G06T 2207/20081* (2013.01); *G06T 2207/20084* (2013.01)

(58) Field of Classification Search
CPC ...... G06V 10/82; G06V 10/95; G06Q 10/087; G06T 7/11; G06T 2207/20081; G06T 2207/20084

USPC ......................................................... 382/157
See application file for complete search history.

(56) References Cited

U.S. PATENT DOCUMENTS

| | | | |
|---|---|---|---|
| 10,846,327 | B2 | 11/2020 | Salokhe et al. |
| 10,846,552 | B1 | 11/2020 | Wu et al. |
| 10,977,528 | B1* | 4/2021 | Tong ........................ G06F 18/22 |
| 12,061,644 | B2* | 8/2024 | Akimoto ............. G06F 16/5846 |
| 2010/0086192 | A1 | 4/2010 | Grigsby et al. |
| 2015/0169638 | A1* | 6/2015 | Jaber ................... G06F 16/5854 |
| | | | 707/749 |
| 2015/0178786 | A1* | 6/2015 | Claessens .......... G06Q 30/0277 |
| | | | 705/14.66 |
| 2017/0193296 | A1* | 7/2017 | Duong .................... G06V 40/20 |
| 2019/0080207 | A1 | 3/2019 | Chang et al. |
| 2019/0188729 | A1 | 6/2019 | Mao et al. |
| 2019/0318405 | A1 | 10/2019 | Hu et al. |
| 2023/0044463 | A1* | 2/2023 | Woolf ............... G06Q 30/0625 |

* cited by examiner

400

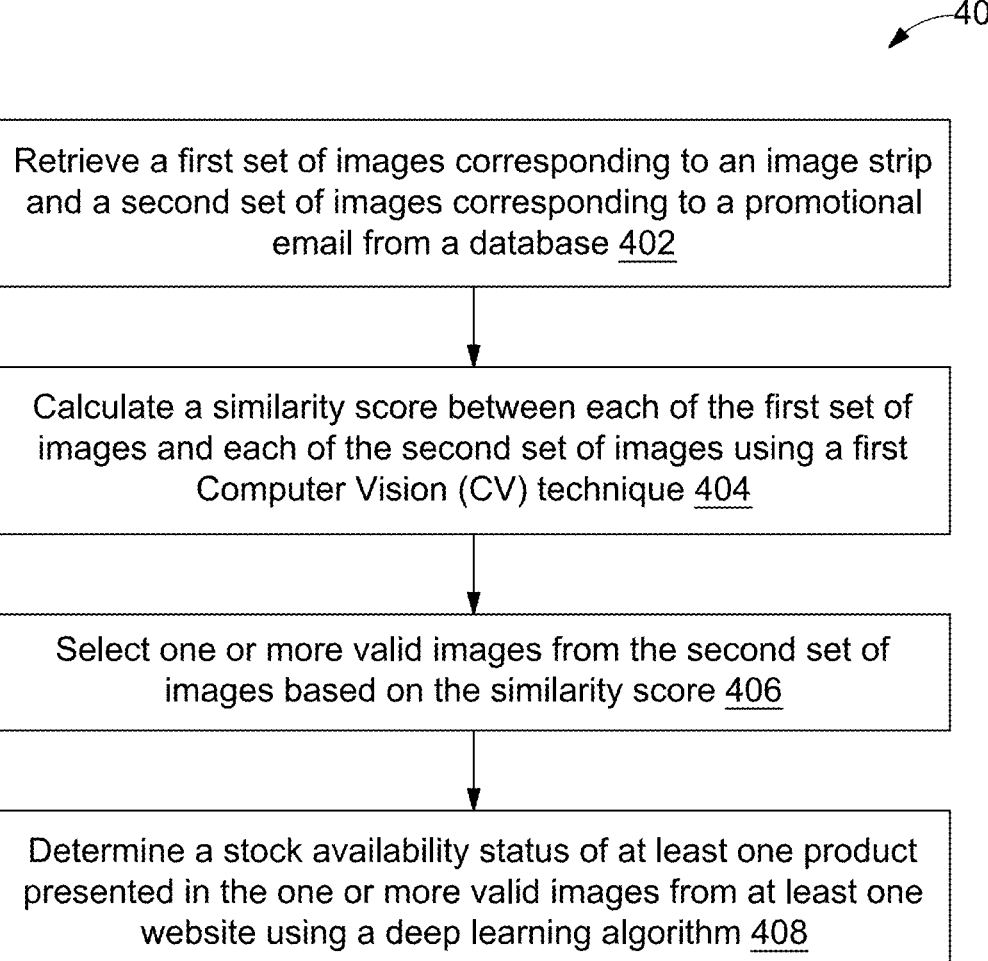

Retrieve a first set of images corresponding to an image strip and a second set of images corresponding to a promotional email from a database 402

Calculate a similarity score between each of the first set of images and each of the second set of images using a first Computer Vision (CV) technique 404

Select one or more valid images from the second set of images based on the similarity score 406

Determine a stock availability status of at least one product presented in the one or more valid images from at least one website using a deep learning algorithm 408

FIG. 4

FIG. 5

600

700A
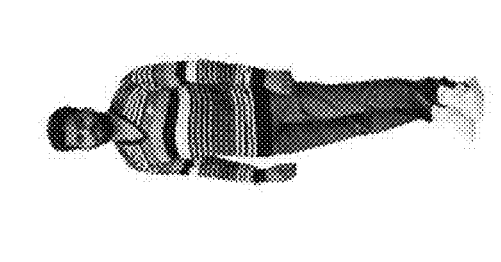
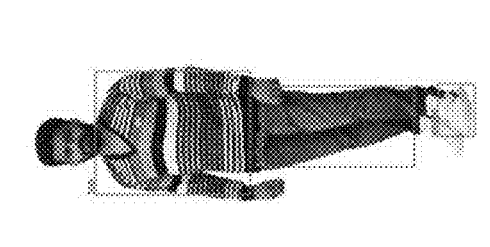
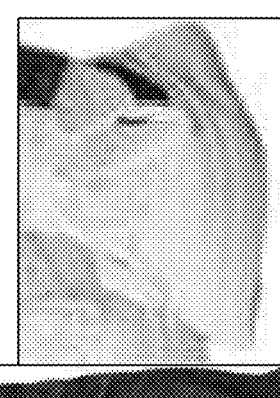
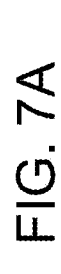
Model Image 702　　Product Identification 704　　Segmented Products for predefined classes 706
FIG. 7A

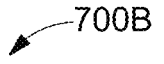
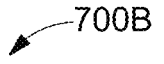
FIG. 7B

METHOD AND SYSTEM FOR VALIDATING PROMOTIONAL EMAILS AND PRODUCT AVAILABILITY FROM E-COMMERCE WEBSITES

TECHNICAL FIELD

This disclosure relates generally to promotional E-mails and product validation, and more particularly to a method and system for validating promotional emails and product availability from websites.

BACKGROUND

Nowadays, online shopping is gaining more popularity worldwide, and E-commerce platforms frequently release a wide range of new products as well as pre-existing designs for each product. To track these products, they are assigned identification numbers, such as, order ID, date, unique number, week number, day, or timestamp. Customers are informed of new products through marketing or promotional emails. E-commerce platforms rely heavily on digital marketing through channels such as email and social media (Facebook, Instagram, WhatsApp, twitter, etc.) to advertise their products. Therefore, it is essential to have a proper validation mechanism in place to ensure that the contents of the marketing email match the newly launched products. The marketing email may include many new arrival products as photographs where each picture may contain individual or multiple products. The email contents are not limited to photographs, it may also include product details in a form of videos, and Graphics Interchange Format (GIF) files.

Product validation in the promotional email and checking for the products availability in the E-commerce platform is a tedious task, as there may be several images with multiple products in each. Testers are required to manually note down the products' design, color, pattern, and shape and then validate their presence on the E-commerce website. This process is to ensure that the customers viewing the website based on marketing email may find the corresponding products on the website. This manual intervention is a time-consuming process, that includes a possibility of oversight in validating the proper match of one-by-one products with the same shape, pattern, and color. In a testing point of view, the challenge is to identify all the visible products and search for its availability on the website manually or with limited automation framework support.

Therefore, in order to provide solutions to the aforementioned drawback, there exists a need to develop an effective method and system that may accurately validate marketing email with its newly launch products contents and to check for validated email products availability on the website with respect to pattern, shape, and color using Artificial Intelligence (AI).

SUMMARY OF INVENTION

In one embodiment, a method for validating promotional emails and product availability from E-commerce websites is disclosed. In one example, the method may include retrieving a first set of images corresponding to an image strip and a second set of images corresponding to a promotional email from a database. The first set of images and the second set of images may be associated with one or more products. The method may further include calculating a similarity score between each of the first set of images and each of the second set of images using a first Computer Vision (CV) technique. The method may further include selecting one or more valid images from the second set of images based on the similarity score. The method may further include determining a stock availability status of at least one product presented in the one or more valid images from at least one website using a deep learning algorithm. It should be noted that each of the at least one product may be a part of the one or more products.

In another embodiment, a system for validating promotional emails and product availability from E-commerce websites is disclosed. In one example, the system may include a processor and a memory communicatively coupled to the processor, wherein the memory stores processor-executable instructions, which, on execution, may cause the processor to retrieve a first set of images corresponding to an image strip and a second set of images corresponding to a promotional email from a database. The first set of images and the second set of images may be associated with one or more products. The processor-executable instructions, on execution, may further cause the processor to calculate a similarity score between each of the first set of images and each of the second set of images using a first Computer Vision (CV) technique. The processor-executable instructions, on execution, may further cause the processor to select one or more valid images from the second set of images based on the similarity score. The processor-executable instructions, on execution, may further cause the processor to determine a stock availability status of at least one product presented in the one or more valid images from at least one website using a deep learning algorithm. It should be noted that each of the at least one product may be a part of the one or more products.

In yet another embodiment, a non-transitory computer-readable medium storing computer-executable instructions for validating promotional emails and product availability from E-commerce websites is disclosed. In one example, the stored instructions, when executed by one or more processors cause the one or more processors to perform operations including retrieving a first set of images corresponding to an image strip and a second set of images corresponding to a promotional email from a database. The first set of images and the second set of images may be associated with one or more products. The operations may further include calculating a similarity score between each of the first set of images and each of the second set of images using a first Computer Vision (CV) technique. The operations may further include selecting one or more valid images from the second set of images based on the similarity score. The operations may further include determining a stock availability status of at least one product presented in the one or more valid images from at least one website using a deep learning algorithm. It should be noted that each of the at least one product may be a part of the one or more products.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 4 is a flow diagram of a method for validating promotional emails and product availability from E-commerce websites, in accordance with an embodiment.

FIG. 5 illustrates an exemplary images corresponding to a set of predefined categories, in accordance with an exemplary embodiment.

FIG. 7A illustrates an exemplary image of model category for detection of at least one product in the valid image to provide a segmented product image, in accordance with an exemplary embodiment.

FIG. 7B illustrates an exemplary image depicting extraction of a set of pattern and color features from a segmented product image, in accordance with an exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
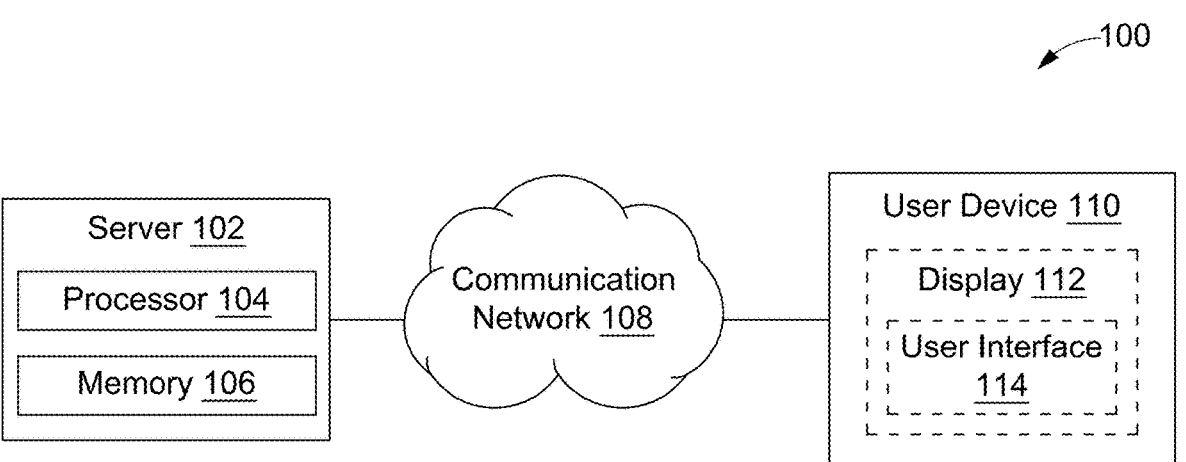
FIG. 1 is an environment diagram illustrating a system for validating promotional emails and product availability from E-commerce websites, in accordance with an embodiment.

Referring now to FIG. 1, an environment diagram of a system 100 for validating promotional emails and product availability from E-commerce websites is illustrated, in accordance with an embodiment. The system 100 may be applicable to all E-commerce sectors, where new products are launched on a daily basis and to confirm presence of the newly launched products on E-commerce portal and/or website using Artificial Intelligence (AI). It should be noted that the E-commerce sectors including fashion domain represented in the one or more embodiments of the present disclosure is taken as sample use case. As will be appreciated, the present disclosure may also support similar product in Software Testing Life Cycle (STLC) across the domains. The domains in E-commerce sector may include, but are not limited to, a fashion domain, a home appliances domain, a kitchen domain, a furniture domain, an electronics domain, and a manufacturing domain. The present disclosure supports computer and mobile versions that may be plugged into any of the existing testing framework or may be used as standalone.

The system 100 may include a server 102, and a user device 110 associated with a user. The server 102 may be a centralized server or a group of decentralized servers that may be communicatively coupled with the user device 110 via a communication network 108. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Examples of the user device 110 may include a smartphone, a tablet, a laptop, a desktop, a notebook, a mobile phone, an application server, or the like.

The user may be a tester that intends to validate promotional emails and product availability from E-commerce websites via the server 102. More particularly, the tester may have a provision to overcome the challenges in image validation, identification of products and matching the products on the E-commerce website seamlessly. By this the end-to-end testing process in E-commerce merchandise, wholesaler, or retailer sectors may be automated without any manual intervention.

The system 100 may include various modules that enable the server 102 to validate promotional emails and product availability from E-commerce websites. These modules are explained in detail in conjunction with FIG. 2 and FIG. 3. As will be described in greater detail in conjunction with FIGS. 2-7, in order to validate promotional emails and product availability from E-commerce websites, the server 102 may initially retrieve a first set of images corresponding to an image strip and a second set of images corresponding to a promotional email from a database, the first set of images and the second set of images are associated with one or more products. The server 102 may further calculate a similarity score between each of the first set of images and each of the second set of images using a first Computer Vision (CV) technique. The server 102 may further select one or more valid images from the second set of images based on the similarity score. The server 102 may further determine a stock availability status of at least one product presented in the one or more valid images from at least one website using a deep learning algorithm. It should be noted that each of the at least one product is a part of the one or more products.

In an embodiment, the server 102 may include a processor 104 that is communicatively coupled to a memory 106 which may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to, Dynamic Random Access Memory (DRAM), and Static Random-Access Memory (SRAM).

The memory 106 may store instructions that, when executed by the processors 104, cause the processor 104 to perform validation of promotional emails and product availability from E-commerce websites. The memory 106 may also store various data (e.g., first set of images corresponding to the image strip and second set of images corresponding to the promotional email, one or more valid images, one or more website images, similarity score values, matching score values, etc.) that may be captured, processed, and/or required by the server 102. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Further, the user device 110 may include a display 112. The display 112 may include a user interface 114. The user may interact with the server 102 and vice versa through the display 112 and the user interface 114. By way of an example, the display 112 may be used to display results (i.e., display one or more valid images corresponding to the promotional email, display one or more valid images of at least one product from at least one E-commerce website, etc.,) based on actions performed by the server 102, to an end-user (i.e., any person, a customer, a group, entities, etc.,).

By way of another example, the user interface 114 may be used by the user to provide inputs to the server 102. Thus, for example, in some embodiments, the user may ingest an input via the user interface 114. The input may include the first set of images corresponding to the image strip and the second set of images corresponding to the promotional email. Based on the input, the processor 104 in conjunction with the server 102 may perform one or more operations to validate promotional emails and product availability from E-commerce websites and display the one or more validated images and product availability of the validated images on the user device 110 via the user interface 114.

Figure 2:
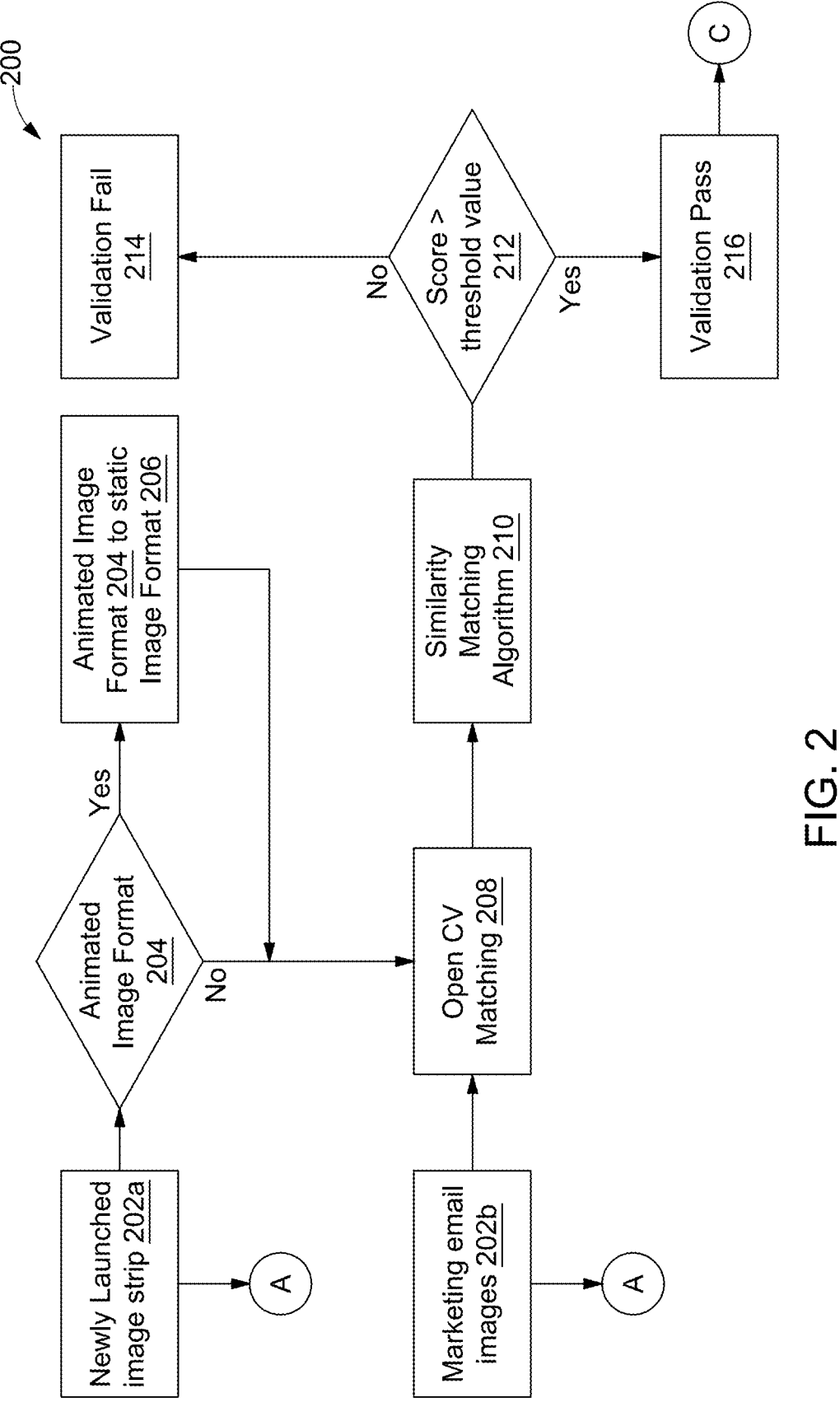
FIG. 2 is flow diagram of an exemplary control logic for validating promotional emails, in accordance with an embodiment.

Referring now to FIG. 2, a flow diagram of an exemplary control logic 200 for validating promotional emails is illustrated, in accordance with an embodiment of the present disclosure. In an embodiment, the control logic 200 may be implemented by the server 102. The process of validating promotional emails and product availability from E-commerce websites may be performed broadly in two steps. A first step is to validate whether promotional emails sent to customers and a newly launched product contents are identical or not. A second step is to check for availability of products present in the validated promotional email from the E-commerce portal/website with respect to pattern, shape, and color. The first step of validation is explained in conjunction with the control logic 200 of present FIG. 2. The second step is explained in conjunction with the control logic 300 of FIG. 3.

The promotional emails may include images of all new products that may be send to one or more customers for promotional campaigning. The promotional email content, format and design may vary frequently to attract their customers. The newly launched products images count may vary on daily basis based on the inflow. The images of newly launched products may be consolidated with batches into an image strip with a tracking id for reference purpose. The first step intents to download a newly launched image strip 202*a* and a promotional email images 202*b* and store into a database for validation purposes. The server 102 may consider the image strip of newly launched products and its corresponding promotional email as input for further processing.

More particularly, in order to initiate the process of validating promotional emails, initially the control logic 200 may retrieve a first set of images corresponding to an image strip (newly launched image strip 202*a*) and a second set of images corresponding to a promotional email (e.g., promotional email images 202*b*) from the database. The first set of images and the second set of images may be associated with one or more products.

The retrieved first set of images corresponding to the image strip may include a combination of static and dynamic images with or without text contents. Therefore, the control logic 200 may further identify a current format associated with each image of the first set of images retrieved. The current format may be one of a static image format 206 or an animated image format 204 (also referred as dynamic image format). The static image format 206 may include, but is not limited to, a PNG format, a web picture format, a JPG format, or a JIFF format. The animated image format 204 may include, but is not limited to, a GIF format, or one or more video file formats. When the current format of the first set of images corresponding to the image strip is the animated image format 204 (e.g., the GIF format, or the video file formats), then the control logic 200 may transform the current format of the image from the animated image format 204 to the static image format 206.

In particular, the GIF or video file usually include multiple frames of images in the animated image format 204, where each frame needs to be retrieved using a separate extraction module. Thus, individual frames extracted from the GIF, or the video files may get saved in the PNG or JPG format.

Once the first set of images corresponding to the image strip is transformed in the static image format 206, each of the first set of images (for example, in the static image format 206) may further be compared against the second set of images corresponding to the promotional email using open CV technique 208. In order to compare the image strip with the promotional email images, the control logic 200 may calculate a similarity score between each of the first set of images and each of the second set of images using a first CV technique (e.g., open CV technique 208) The CV technique is a method that uses a similarity matching algorithm 210 to find a similarity score between the two images i.e., the first set of images and the second set of images.

Based on the similarity score, the control logic 200 may further select one or more valid images from the second set of images. In other words, based on similarity score values greater than the predefined threshold of the first set of images in the image strip may get labelled as 'VALIDATION PASS' 216 or 'VALIDATION FAIL' 214. For example, the image strip having similarity score values greater than a predefined threshold 212 may be labelled as 'VALIDATION PASS' 216. A detailed matching report gets generated in an excel file with match percentages for the tester reference. The matching report may also cover the scenarios when a small distortion or thin line crossing any of the images under comparison is considered as 'VALIDATION FAIL' 214 or 'FAIL'. It may be noted that there should not be any minor variations between the images of promotional email and the images of image strip to conclude as 'VALIDATION PASS' 216 or 'PASS'. This validation step may ensure that retailer images corresponding to the newly launched products is precisely same as marketing email sent to their customers.

Figure 3:
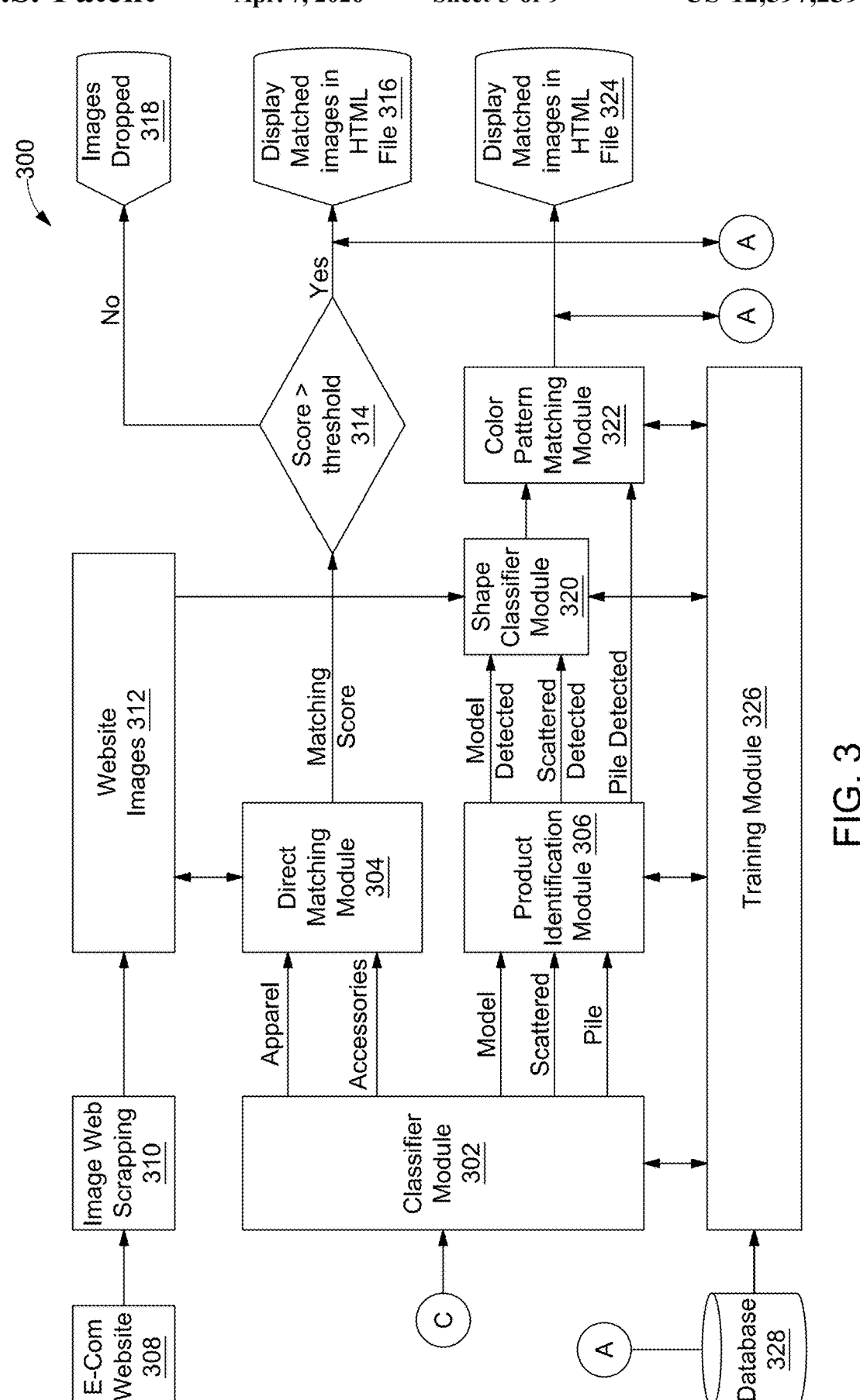
FIG. 3 is flow diagram of another control logic for determining product availability of validated images from E-commerce websites, in accordance with an embodiment.

Referring now to FIG. 3, a flow diagram of another exemplary control logic 300 for determining product availability of validated images from E-commerce websites is illustrated, in accordance with an embodiment of the present disclosure. FIG. 3 is explained in conjunction with elements from FIG. 2. In an embodiment, the control logic 300 may be implemented by the server 102. Upon completion of the first step of validation, the control logic 300 may start the second step of validation for checking availability of products present in the validated promotional email from the E-commerce portal/website. In other words, once the one or more valid images is selected from the second set of images, the control logic 300 may determine a stock availability status of at least one product presented in the one or more valid images from at least one website using a deep learning algorithm.

In order to determine the stock availability status of at least one product, the control logic 300 may classify the one or more valid images into a set of predefined categories based on content of each of the one or more valid images through the deep learning classification model. Further, for each of the one or more valid images, the control logic 300 may determine whether identification of the at least one product in a valid image is required based on a predefined category associated with the valid image. In case, when the identification of the at least one product in the valid image is not required, the control logic 300 may directly match the valid image with one or more images of the at least one website using a second CV technique. In case, when the identification of the at least one product in the valid image is required, the control logic 300 may detect the at least one product in the valid image using a Faster Region-based Convolutional Neural Network (Faster RCNN) model to provide a segmented product image.

In a more elaborative way, the deep learning algorithms play a vital role in the second step validation, where multi-level processing may be required to perform image classification, product identification, shape classification, pattern, and color matching for the 'PASS' images. All the 'PASS' images content may be different that needs to be classified into appropriate classes (e.g., into the set of predefined categories) for ease of further processing. In the image classification, name of predefined categories may be varied based on nature of the domain and test requirements. As an example, for the use case disclosed in the present disclosure, the images may be classified into five predefined categories i.e., an apparel category, an accessory category, a model category, a scattered category, and a pile category. An exemplary images corresponding to the set of predefined categories is represented via FIG. 5.

The second step of validation starts with inputting the 'PASS' images in an image classifier module 302 to classify the input 'PASS' images into any of the five predefined categories using a custom Deep Learning (DL) classification model (e.g., CNN DL architecture based model).

In the image classifier module 302, the 'PASS' images classified as 'Apparel' may have only one cloth product in the entire image. The product may be of any shape, design and color and may qualify for a direct match with the retailer website products. The products in the apparel category may include, but are not limited to, a T-Shirt, a shirt, a trouser, a long dress, a skirt, a denim, a saree, a jumpsuit, or a blazer. The 'PASS' images classified as 'Accessories' may have only one or a set of products. This category mostly may have pair of cloth, non-cloth products and covers all single non-cloth products. The products of this category may go for direct matching. This category includes products such as, but not limited to, earrings, shoes, gloves, watches, socks, ring, or necklace.

The 'PASS' images may be classified as a 'Model' when presence of a person or a human is detected. This category includes images where a fashion model or a group of models may be wearing single or multiple products to display the product outfit. The objective is to detect all the visible products in human models and classify the products for next level of processing. The images of model category may have different background and lighting conditions that may be taken care of. The 'PASS' images classified as 'Scattered' category represents images that may display products in a scattered manner. These images may include multiple products oriented at different angles for display. The products in the scattered images may be separated by space and in few instances where the products may be overlying. These are bit challenging for the customized CNN model to identify the class of the product where shape is partially visible.

The image classification for the 'Pile' category may depend on product layout in a stack-like structure or a similar pattern. It makes this category more complex to get the visibility of the product shape for detection. There may be categories where the detected products are of minimal size, and only visible areas of the products may get segmented for further processing. This may not be limited to horizontal or vertical pile of products.

Upon analyzing the classified images, the control logic 300 may determine which category of image from the classified images require product identification. The images that required product identification may only passed to a product identification module 306, and the remaining images may be passed to a direct matching module 304 based on classification tags. The images passed to the direct matching module 304 may be qualified for direct match with the E-commerce retailer/wholesaler website images 312 using CV technique (e.g., a second CV technique). The images passed to the direct matching module 304 belong to any of the two categories such as, apparel category or accessories category. The images passed to product identification module 306 belong to any of the three categories such as, model category, scattered category, or pile category. Each of the category may have different orientation of products and a visibility of product may be varying based on image nature.

In direct matching, most of the products grouped in this category may be displayed as an image in the E-commerce website 308. These images may not require any detection methods for product identification tasks. The products may have a clear delineation and space between product pairs or single product. The apparel and accessories categories images may be matched with downloaded website images 312 using CV technique and a score may be verified to declare as 'Match' or 'No Match'. In particular, a direct matching score may be calculated corresponding to the apparel and accessories categories images. If the direct matching score is found to be greater than a predefined threshold matching score 314, then the matching images may be displayed 316 in an output file (e.g., HTML file). 'No Match' images may be dropped 318.

For product identification a cognizance model may be trained using customized Faster-R-CNN architecture to identify the products present in images efficiently. The categories like model, scattered and pile may pass through their respective custom trained DL model to detect the visible products. The product detection may be challenging task when the image or product is partially visible. In scattered, model and pile categories, the products may be overlaying on each other due to the orientation or image posture. The Faster-RCNN model may be trained to identify the partially visible products and map to their respective categories. Each of the three types of categorized images may have different orientations of products. For example, the model category may be configured to identify sixteen predefined classes of products. Similarly, for scattered and pile categories the number of product class may be defined based on the test requirements. It should be noted that class types may be varied depending on the domains and test requirements. All the detected products may be segmented and passed to the shape classifier.

In a more elaborate way, for the model category the F-RCNN model got trained by a training module 326 with a large set of images extracted from a database 328. All visible products get labelled with concern class names using an annotation tool. Each bounding box may represent an individual product class that provides information for the F-RCNN deep learning model to learn. This learning process helps the F-RCNN algorithm to identify products from the image. A detailed study may be performed on E-commerce websites to analyze different types of products and their properties. The model category may be tagged for sixteen predefined classes of products such as, but not limited to, top, bottom, belt, earring, ring, shoes, hat, sunglass, bag, bracelet, tie, headband, socks, necklace, gloves, and fancy tie. These sixteen classes may ensure all products are taken care of in each image. The F-RCNN model performance got validated using approximately 30 thousand images containing visually seen products for all classes. For this category, the trained model overall performance is found to be approximately 96%.

The scattered category may use the same product identification classes as the model category. These classes may ensure to cover all the products displayed in the classified image. The product orientation may be in a distributed manner for this category. At times the products may be overlayed partially or similar. The images suitable for the scattered category may be manually selected and used for training the DL model. The model performance got validated using a sample of around 15 thousand images retrieved from the database 328 for product detection. Based on validation results, the overall performance of the model is found close to approximately 94%.

The product layout for the images in the pile category makes the segmentation task a bit complex to get the appropriate shape and product pattern. The sample images of the pile category may be collected from the database 328 to create the dataset for the training process. This data may be labelled into classes such as, but not limited to, cloth, accessories, and rest of products, to cover all the products for this category. These classes may be defined based on the testing requirements. The trained F-RCNN model performance got validated with around fifteen thousand sample images that may provide a detection accuracy of approximately 85%. The deep learning model in pile category may be trained further by fine-tuning hyper parameters with sizeable samples to improve the performance.

Once the product identification process is completed, the detected products in each of the model category and the scattered category may be passed through a shape classifier module 320 followed by color and pattern matching module 322 for final product matching. For the pile category, a shape of the detected objects may be varying from the actual product and the area available for detection may be minimal. Thus, considering these aspects, the detected pile images may be directly passed to the color and pattern matching module 322 for final product matching.

The shape classifier module 320 is a combination of CNN deep learning architecture with a rule-based model to perform the shape filtration tasks at Product Information Management (PIM) and the retailer website images 312. The rule-based model plays a vital role in filtering and sorting products of same shapes into a single shape category. The custom CNN model may be trained to analyze the website products based on their shape and classify into three categories, for example, shape 1, shape 2 and shape 3. Each of the segmented products excluding the pile category in PIM and the website images 312 downloaded from E-commerce website 308 may pass through the shape classifier module 320 to segregate the products based on their shape feature and the rules framed. This CNN shape classification model is trained using manually selected adequate sample images from the database 328. The performance of this model is found to be around 97%.

The shape classifier module 320 may segregate the detected products into any of the three categories (i.e., shape 1, shape 2, and shape 3). However, these categories may be extended based on the test requirements. The shape 1 classified products from website side and PIM may have similar type of products (similarly for other shape categories as well). The shape classifier module 320 plays a crucial role in filtering the segmented products internally, that may help to get the relevant products in similar shape for matching process. On the other side, the product images from E-commerce website 308 may be downloaded into the database 328 using an image web scraping 310 algorithm. The website images 312 downloaded may pass through the shape classifier module 320 to get classified into three categories i.e., shape 1, shape 2, and shape 3.

By way of an example, a shirt detected by the PIM may be later segmented and passed through the shape classifier module 320. Based on the nature of product shape, the segmented image may be classified into any one of the category as shape 1, shape 2 or shape 3. In website the same shirt may be in folded, twisted shape or kept in hanger for display. The shape classifier module 320 may have an intelligence to classify folded shirt image from the web portal and the detected shirt from the PIM into a particular class even though there is a difference in shape. In this type of scenario, the rules may be framed such that the color and pattern may have higher precedence over shape.

Once the shape classification is completed, further, the color and pattern matching module 322 may receive segmented products with shape information. The features related all aspect of pattern and color may be extracted from the shape categorized products. The extracted features may be used for final product matching. The final matching tasks may be performed with the shape classified products against the website images products concerning shape, pattern, and color. In particular, the final matching may be performed between the segmented product images against the website images 312 in the color and pattern matching module 322 to provide match results concerning shape, color, and pattern. In some instances, there may be minor variances with color, contrast, and brightness with promotional email images and website images may also be taken care of during matching.

The color and pattern matching module 322 may employ a CNN deep learning architecture based product matching model that may help to extract features from the provided image based on visible patterns and color. A distance algorithm may be applied to the extracted features to calculate the matching score. The color-matching algorithm may help to identify the products of similar colors and patterns between the shape classification model outputs. Each product in the database is a source that may be matched with the list of products available in the E-commerce website 308.

The final match results may be displayed 324 with identified products in HTML file along with detailed reports (preferably in excel format). In some embodiments, the website products may get listed in ascending order based on score values of match results in the HTML file. For example, consider the segmented product is a blue skirt. There might be two or three blue skirts available with different size or with a minor change like a button in the skirt as design. These results may help testers to view a segmented product alongside the promotional email image with segmented product and matched products for verification. The number of relevant products displayed in the final match results is a configurable parameter to support user requirements. The tester may provide an option to confirm the validated results. The validated results may be considered along with the email and segmented images for training purposes.

It should be noted that all such aforementioned modules 302-328 may be represented as a single module or a combination of different modules. Further, as will be appreciated by those skilled in the art, each of the modules 302-328 may reside, in whole or in parts, on one device or multiple devices in communication with each other. In some embodiments, each of the modules 302-328 may be implemented as dedicated hardware circuit comprising custom application-specific integrated circuit (ASIC) or gate arrays, off-the-shelf semiconductors such as logic chips, transistors, or other discrete components. Each of the modules 302-328 may also be implemented in a programmable hardware device such as a field programmable gate array (FPGA), programmable array logic, programmable logic device, and so forth. Alternatively, each of the modules 302-328 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Referring now to FIG. 4, a flow chart of a method 400 for validating promotional emails and product availability from E-commerce websites is illustrated, in accordance with an embodiment. At step 402, a first set of images corresponding to an image strip and a second set of images corresponding to a promotional email may be retrieved from a database.

The first set of images and the second set of images may be associated with one or more products.

In some embodiments, the method 400 may identify a current format associated with each image of the first set of images retrieved from the database. The current format may be one of a static image format or an animated image format. Upon identifying the current format is the animated image format, the method 400 may further transform the current format of the image from the animated image format to the static image format.

At step 404, a similarity score between each of the first set of images and each of the second set of images may be calculated using a first CV technique. Based on the similarity score, one or more valid images may be selected from the second set of images, at step 406. The one or more validated images corresponding to the image strip is represented via FIG. 6.

At step 408, a stock availability status of at least one product presented in the one or more valid images may be determined from at least one website using a deep learning algorithm. It should be noted that each of the at least one product may be a part of the one or more products. In some embodiments, in order to determine the stock availability status of the at least one product, the method 400 may first classify the one or more valid images into a set of predefined categories based on content of each of the one or more valid images through a deep learning classification model. The set of predefined categories include an apparel category, an accessory category, a model category, a scattered category, and a pile category.

For each of the one or more valid images, the method 400 may further determine whether identification of the at least one product in a valid image is required based on a predefined category associated with the valid image. When the identification of the at least one product in the valid image is not required, then the method 400 may directly match the valid image with one or more images of the at least one website using a second CV technique. When the identification of the at least one product in the valid image is required, then the method 400 may detect the at least one product in the valid image using a Faster RCNN model to provide a segmented product image.

In some embodiments, in order to directly match the valid image with one or more images of the at least one website, the method 400 may calculate a direct matching score corresponding to the valid image using the second CV technique. Based on the direct matching score and a predefined threshold matching score, the method 400 may render the valid image in an output file (e.g., HTML file).

In some embodiments, in order to detect the at least one product in the valid image, the method 400 may further classify the at least one detected product in the segmented product image into a set of shape categories using a rule-based CNN model based on the predefined category associated with the valid image. The method 400 may further classify at least one product in each of one or more website images of the at least one website into the set of shape categories using the rule-based CNN model to obtain a shape-classified website image.

The method 400 may further extract a set of pattern and color features from the segmented product image and the one or more website images using a CNN matching model based on an associated shape category. The method 400 may further calculate a matching score between the segmented product image and the one or more website images using a distance algorithm. Additionally, the method 400 may render the valid image of the segmented product image in an output file based on the matching score and a predefined threshold matching score. The process of determining the stock availability status of at least one product presented in the one or more valid images is already explained in greater detail in conjunction with FIG. 3.

Referring now to FIG. 5, an exemplary images 500 corresponding to a set of predefined categories is illustrated, in accordance with an exemplary embodiment. As discussed earlier, once the images corresponding to the promotional email is validated. The validated promotional email images may further be checked for the availability in one of the E-commerce portal/website. Since, each product in the validated images may have different shape, pattern, and color. Therefore, it may be required to categorize each of the product present in the validated images in the set of predefined categories for ease of further processing.

The exemplary images 500 categorized into five predefined categories is represented via the present FIG. 5. The predefined categories may include an apparel category 502, an accessory category 504, a scattered category 506, a model category 508 and a pile category 510. The products in the apparel category 502 may include, but are not limited to, a T-Shirt, a shirt, a trouser, a long dress, a skirt, a denim, a saree, a jumpsuit, or a blazer. The products in the accessory category 504 may include, but are not limited to, earrings, shoes, gloves, watches, socks, ring, or necklace. The products in the scattered category 506 may include multiple products oriented at different angles for display. The products in the scattered category 506 may be separated by space and in few instances where the products may be overlying. The products in the model category 508 may include images where a fashion model (e.g., a person) or a group of models may be wearing single or multiple products to display the product outfit. The products in the pile category 510 may include stack-like structure or a similar pattern of image, for example, multiple towels of different pattern placed on one another either vertically or horizontally.

Figure 6:
FIG. 6 illustrates an exemplary set of validated images corresponding to an image strip, in accordance with an exemplary embodiment.

Referring now to FIG. 6, an exemplary set of validated images 600 corresponding to an image strip is illustrated, in accordance with an exemplary embodiment. Whenever any new products are launched, the promotional campaigning of such newly launched products may be done by sending promotional emails to the customers. Therefore, it is necessary to validate whether the promotional emails sent to the customer is identical with its newly launch products contents. The present FIG. 6 illustrates the exemplary set of validated images 600 obtained upon validation of the promotional email with the newly launch products images. In other words, the present FIG. 6 represent the validated images 600 of the image strip obtained upon completion of first step of validation. The image strip may be highlighted with promotional email images on match. The same may be highlighted and marked as 'VALIDATION PASS', as shown in FIG. 6.

Referring now to FIG. 7A, an exemplary image 700A of model category for detection of at least one product in the valid image to provide a segmented product image is illustrated, in accordance with an exemplary embodiment. Therefore, in order to provide the segmented product image, initially a model image 702 from the model category 508 may be input to the product identification module 306 (e.g., F-RCNN deep learning model) for product identification 704. In this process, all the visible products may be labelled with concern class names using an annotation tool. Each bounding box may represent an individual product class. Upon identifying each product from the model image 702.

The model may be tagged with predefined classes 706 such as, but not limited to, shirt, jeans, and shoes, as depicted in the present FIG. 7A.

Referring now to FIG. 7B, an exemplary image 700B depicting extraction of a set of pattern and color features from a segmented product image is illustrated, in accordance with an exemplary embodiment. The shirt detected from the model image may be later segmented and passed through the shape classifier module 320. Based on the nature of product shape, the segmented image may be classified into any one of the category as shape 1, shape 2 or shape 3. In website the same shirt may be in folded, twisted shape or kept in hanger for display. The shape classifier module 320 may have an intelligence to classify folded shirt image from the web portal and the detected shirt from the model image into a particular class even though there is a difference in shape. In this type of scenario, the rules may be framed such that the color and pattern may have higher precedence over shape.

As will be appreciated by those skilled in the art, the techniques described in the various embodiments discussed above are not routine, or conventional, or well understood in the art. The techniques discussed above provide for validating promotional emails and product availability from e-commerce websites. The disclosed techniques may overcome challenges of manual effort that may occur during validation of promotional emails and product availability from e-commerce websites. Therefore, the above disclosed techniques have been automated to overcome the problem of matching new launch image strip with promotional emails with or without text information without any manual intervention. The disclosed techniques may further check for validated email products availability in the wholesaler/retailer website with respect to pattern, shape, and color. The proposed techniques may reduce the overall testing cycle and eliminates the manual efforts invested by the tester. The proposed techniques may perform end-to-end validation of products by using AI without any manual intervention. Further, the proposed techniques may have a provision to integrate with standard automation testing tools, framework or standalone. Further, the proposed techniques may be extended to support other domains of E-commerce as well. The proposed techniques support input formats like PNG, JPEG, GIF, JIFF, TIFF, WEBP, and video files. Further, the proposed techniques may provide a detailed test validation reports for reference. The proposed techniques may support desktop and mobile version for windows, Linux, macOS, android and IOS.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
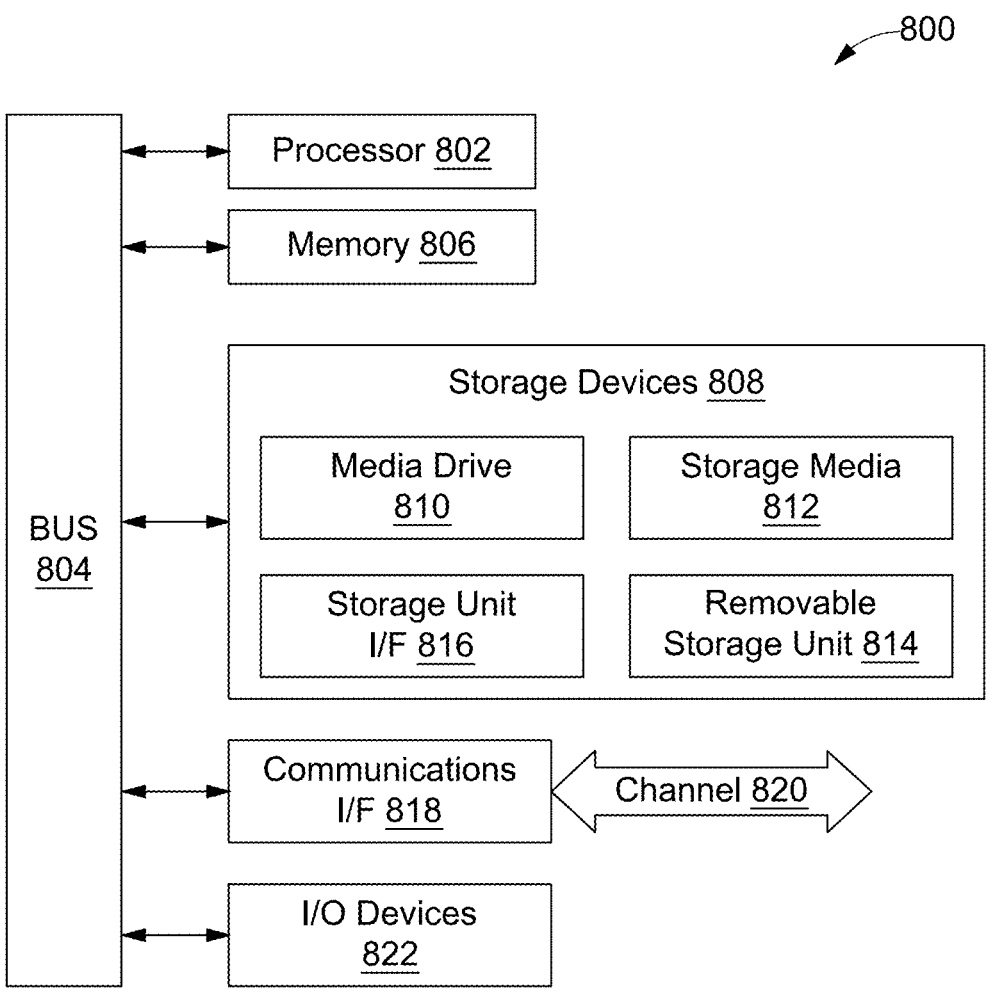
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, an exemplary computing system 800 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 800 may represent, for example, a user device such as a desktop, a laptop, a mobile phone, personal entertainment device, DVR, and so on, or any other type of special or general-purpose computing device as may be desirable or appropriate for a given application or environment. The computing system 800 may include one or more processors, such as a processor 802 that may be implemented using a general or special purpose processing engine such as, for example, a microprocessor, microcontroller or other control logic. In this example, the processor 802 is connected to a bus 804 or other communication medium. In some embodiments, the processor 802 may be an Artificial Intelligence (AI) processor, which may be implemented as a Tensor Processing Unit (TPU), or a graphical processor unit, or a custom programmable solution Field-Programmable Gate Array (FPGA).

The computing system 800 may also include a memory 806 (main memory), for example, Random Access Memory (RAM) or other dynamic memory, for storing information and instructions to be executed by the processor 802. The memory 806 also may be used for storing temporary variables or other intermediate information during execution of instructions to be executed by the processor 802. The computing system 800 may likewise include a read only memory ("ROM") or other static storage device coupled to bus 804 for storing static information and instructions for the processor 802.

The computing system 800 may also include storage devices 808, which may include, for example, a media drive 810 and a removable storage interface. The media drive 810 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 812 may include, for example, a hard disk, magnetic tape, flash drive, or other fixed or removable medium that is read by and written to by the media drive 810. As these examples illustrate, the storage media 812 may include a computer-readable storage medium having stored therein particular computer software or data.

In alternative embodiments, the storage devices 808 may include other similar instrumentalities for allowing computer programs or other instructions or data to be loaded into the computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from the removable storage unit 814 to the computing system 800.

The computing system 800 may also include a communications interface 818. The communications interface 818 may be used to allow software and data to be transferred between the computing system 800 and external devices. Examples of the communications interface 818 may include a network interface (such as an Ethernet or other NIC card), a communications port (such as for example, a USB port, a micro-USB port), Near field Communication (NFC), etc. Software and data transferred via the communications interface 818 are in the form of signals which may be electronic, electromagnetic, optical, or other signals capable of being received by the communications interface 818. These signals are provided to the communications interface 818 via a channel 820. The channel 820 may carry signals and may be implemented using a wireless medium, wire or cable, fiber optics, or other communications medium. Some examples of the channel 820 may include a phone line, a cellular phone link, an RF link, a Bluetooth link, a network interface, a local or wide area network, and other communications channels.

The computing system 800 may further include Input/Output (I/O) devices 822. Examples may include, but are not limited to a display, keypad, microphone, audio speakers, vibrating motor, LED lights, etc. The I/O devices 822 may receive input from a user and also display an output of the computation performed by the processor 802. In this document, the terms "computer program product" and "computer-readable medium" may be used generally to refer to media such as, for example, the memory 806, the storage devices 808, the removable storage unit 814, or signal(s) on the channel 820. These and other forms of computer-readable media may be involved in providing one or more sequences of one or more instructions to the processor 802 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into the computing system 800 using, for example, the removable storage unit 814, the media drive 810 or the communications interface 818. The control logic (in this example, software instructions or computer program code), when executed by the processor 802, causes the processor 802 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for validating promotional emails and product availability from e-commerce websites, the method comprising:

retrieving, by a server, a first set of images corresponding to an image strip and a second set of images corresponding to a promotional email from a database, wherein the first set of images and the second set of images are associated with one or more products;

calculating, by the server, a similarity score between each of the first set of images and each of the second set of images using a first Computer Vision (CV) technique;

selecting, by the server, one or more valid images from the second set of images based on the similarity score; and determining, by the server, a stock availability status of at least one product presented in the one or more valid images from at least one website using a deep learning algorithm, wherein each of the at least one product is a part of the one or more products, wherein determining a stock availability status of at least one product comprises:

classifying the one or more valid images into a set of predefined categories based on content of each of the one or more valid images through a deep learning classification model;

for each of the one or more valid images, determining whether identification of the at least one product in a valid image is required based on a predefined category associated with the valid image; and at least one of:

directly matching the valid image with one or more images of the at least one website using a second CV technique when the identification of the at least one product in the valid image is not required; or detecting the at least one product in the valid image using a Faster Region-based Convolutional Neural Network (Faster RCNN) model to provide a segmented product image when the identification of the at least one product in the valid image is required.

2. The method of claim 1, wherein directly matching the valid image with one or more images of the at least one website comprises:

calculating a direct matching score corresponding to the valid image using the second CV technique; and rendering the valid image in an output file based on the direct matching score and a predefined threshold matching score.

3. The method of claim 1, wherein detecting the at least one product in the valid image further comprises:

classifying the at least one detected product in the segmented product image into a set of shape categories using a rule-based CNN model based on the predefined category associated with the valid image; and classifying at least one product in each of one or more website images of the at least one website into the set of shape categories using the rule-based CNN model to obtain a shape-classified website image.

4. The method of claim 3, further comprising:

extracting a set of pattern and color features from the segmented product image and the one or more website images using a CNN matching model based on an associated shape category;

calculating a matching score between the segmented product image and the one or more website images using a distance algorithm; and rendering the valid image of the segmented product image in an output file based on the matching score and a predefined threshold matching score.

5. The method of claim 1, wherein the set of predefined categories comprises an apparel category, an accessory category, a model category, a scattered category, and a pile category.

6. The method of claim 1, comprising:

identifying a current format associated with each image of the first set of images, wherein the current format is one of a static image format or an animated image format; and when the current format is the animated image format, transforming the current format of the image from the animated image format to the static image format.

7. A system for validating promotional emails and product availability from e-commerce websites, the system comprising:

a processor and a memory communicatively coupled to the processor, wherein the memory stores processor-executable instructions, which, on execution, causes the processor to:

retrieve a first set of images corresponding to an image strip and a second set of images corresponding to a promotional email from a database, wherein the first set of images and the second set of images are associated with one or more products;

calculate a similarity score between each of the first set of images and each of the second set of images using a first Computer Vision (CV) technique;

select one or more valid images from the second set of images based on the similarity score; and determine a stock availability status of at least one product presented in the one or more valid images from at least one website using a deep learning algorithm, wherein each of the at least one product is a part of the one or more products, wherein determining a stock availability status of at least one product comprises:

classifying the one or more valid images into a set of predefined categories based on content of each of the one or more valid images through a deep learning classification model;

for each of the one or more valid images, determining whether identification of the at least one product in a valid image is required based on a predefined category associated with the valid image; and at least one of:

directly matching the valid image with one or more images of the at least one website using a second CV technique when the identification of the at least one product in the valid image is not required; or detecting the at least one product in the valid image using a Faster Region-based Convolutional Neural Network (Faster RCNN) model to provide a segmented product image when the identification of the at least one product in the valid image is required.

8. The system of claim 7, wherein to directly match the valid image with one or more images of the at least one website, the processor instructions, on execution, further cause the processor to:

calculate a direct matching score corresponding to the valid image using the second CV technique; and render the valid image in an output file based on the direct matching score and a predefined threshold matching score.

9. The system of claim 7, wherein to detect the at least one product in the valid image, the processor instructions, on execution, further cause the processor to:

classify the at least one detected product in the segmented product image into a set of shape categories using a rule-based CNN model based on the predefined category associated with the valid image; and classify at least one product in each of one or more website images of the at least one website into the set of shape categories using the rule-based CNN model to obtain a shape-classified website image.

10. The system of claim 9, wherein, the processor instructions, on execution, further cause the processor to:

extract a set of pattern and color features from the segmented product image and the one or more website images using a CNN matching model based on an associated shape category;

calculate a matching score between the segmented product image and the one or more website images using a distance algorithm; and render the valid image of the segmented product image in an output file based on the matching score and a predefined threshold matching score.

11. The system of claim 7, wherein the set of predefined categories comprises an apparel category, an accessory category, a model category, a scattered category, and a pile category.

12. The system of claim 7, wherein, the processor instructions, on execution, further cause the processor to:

identify a current format associated with each image of the first set of images, wherein the current format is one of a static image format or an animated image format; and when the current format is the animated image format, transform the current format of the image from the animated image format to the static image format.

13. A computer program product for validating promotional emails and product availability from e-commerce websites, the computer program product embodied in a non-transitory computer readable storage medium and comprising computer-executable instructions configured for:

retrieving a first set of images corresponding to an image strip and a second set of images corresponding to a promotional email from a database, wherein the first set of images and the second set of images are associated with one or more products;

calculating a similarity score between each of the first set of images and each of the second set of images using a first Computer Vision (CV) technique;

selecting one or more valid images from the second set of images based on the similarity score; and determining a stock availability status of at least one product presented in the one or more valid images from at least one website using a deep learning algorithm, wherein each of the at least one product is a part of the one or more products, wherein determining a stock availability status of at least one product comprises:

classifying the one or more valid images into a set of predefined categories based on content of each of the one or more valid images through a deep learning classification model;

for each of the one or more valid images, determining whether identification of the at least one product in a valid image is required based on a predefined category associated with the valid image; and at least one of:

directly matching the valid image with one or more images of the at least one website using a second CV technique when the identification of the at least one product in the valid image is not required; or detecting the at least one product in the valid image using a Faster Region-based Convolutional Neural Network (Faster RCNN) model to provide a segmented product image when the identification of the at least one product in the valid image is required.

* * * * *